United States Patent [19]

Kunishige

[11] Patent Number: 5,270,765
[45] Date of Patent: Dec. 14, 1993

[54] AUTOMATIC FOCUSING SYSTEM FOR A CAMERA HAVING A RANGE FINDER

[75] Inventor: Keiji Kunishige, Tokyo, Japan

[73] Assignee: Olympus Optical Co., Ltd., Tokyo, Japan

[21] Appl. No.: 866,140

[22] Filed: Apr. 9, 1992

[30] Foreign Application Priority Data

Apr. 16, 1991 [JP] Japan ................................ 3-84266

[51] Int. Cl.5 ............................................. G03B 13/36
[52] U.S. Cl. ................................................... 354/403
[58] Field of Search ....................................... 354/403

[56] References Cited

U.S. PATENT DOCUMENTS

| | | | |
|---|---|---|---|
| 3,720,148 | 3/1973 | Harvey | 354/403 |
| 4,470,681 | 9/1984 | Johnson | 354/403 |
| 4,571,048 | 2/1986 | Sugawara | 354/403 |
| 4,740,806 | 4/1988 | Takehana | 354/403 |
| 4,827,303 | 5/1989 | Tsuboi | 354/403 |
| 5,137,350 | 8/1992 | Misawa et al. | 354/403 X |

FOREIGN PATENT DOCUMENTS 61-295533 12/1986 Japan .
63-131019 6/1988 Japan .

*Primary Examiner*—W. B. Perkey
*Attorney, Agent, or Firm*—Frishauf, Holtz, Goodman & Woodward

[57] ABSTRACT

In an automatic focusing system, a rangefinder unit is provided with a spot-beam projecting lens and a reflected spot-beam receiving lens which are disposed on the front of the rangefinder case with the space of the base length therebetween in the vertical direction, and a spot-beam emitting device and a reflected spot-beam receiving device which are disposed on the back of the case which is separated from its front by the focal distance of the lenses. The rangefinder unit is moved to scan a subject in a direction perpendicular to the base line, thereby permitting movement of the rangefinder unit to be made small. The automatic focusing system can be made compact and exclude the influence of an error in contrast due to partial return spot-beam images on the spot-beam receiving element.

1 Claim, 12 Drawing Sheets

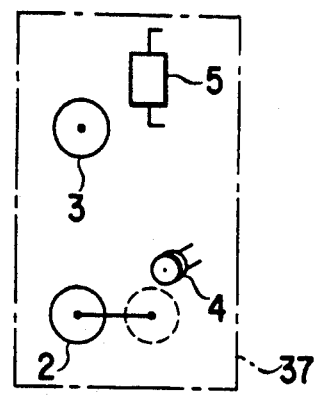
F I G. 6A
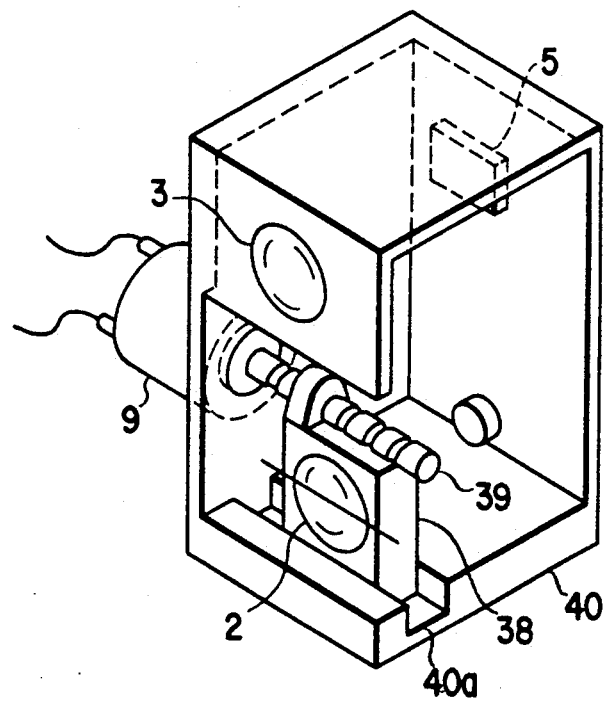
F I G. 6B

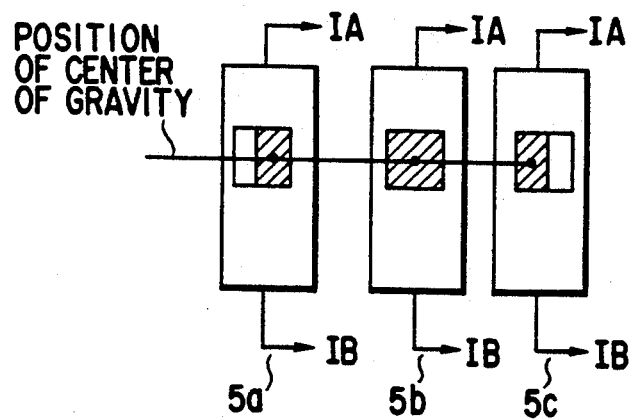
FIG. 7B
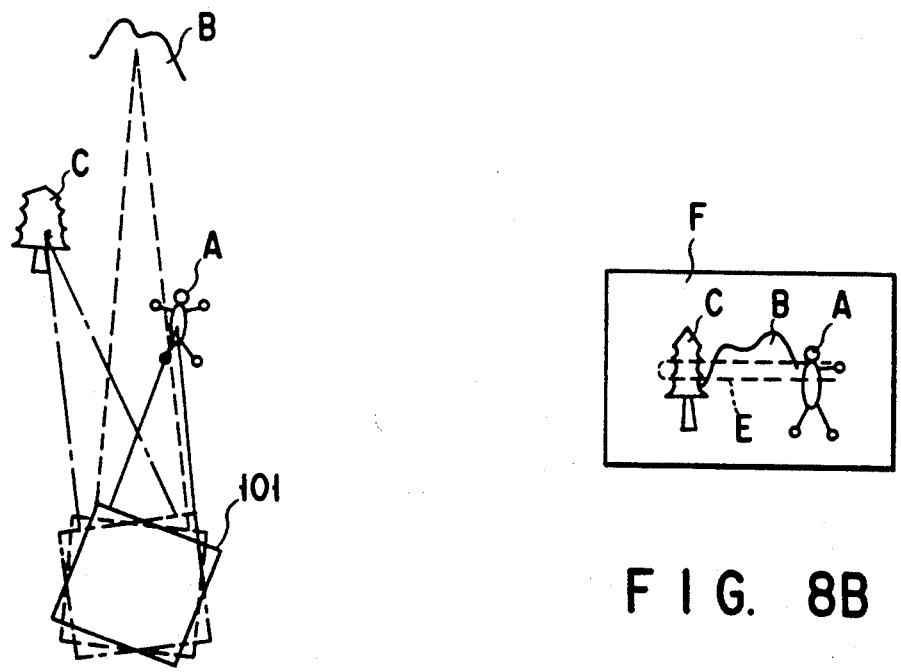
FIG. 8A
FIG. 8B

AUTOMATIC FOCUSING SYSTEM FOR A CAMERA HAVING A RANGE FINDER

BACKGROUND OF THE INVENTION

1. Field of the Invention

The present invention relates to an automatic focusing system which has an improved infrared-active rangefinder operating in triangulation scheme.

2. Description of the Related Art

With an automatic focusing system which measures the distance from the viewfinder and a single point, the light from a subject of photography focuses at the center of the viewfinder field. Hence, the system finds the distance between the viewfinder and any subject caught at the center of the viewfinder field. Here arises a problem. If two subjects of photograph, for example, are caught at the sides of the viewfinder field and located nearer than other subjects (e.g., the background), they will be out of focus. This type of out-of-focus is generally known as "central focus error."

FIG. 8A illustrates a positional relationship between subjects and a camera, and FIG. 8B illustrates a concrete example of the view of the subjects within the viewfinder F of the camera.

That is, when a subject A (a person) and a subject C (a tree) are photographed with a camera incorporating a automatic focusing system of the type described above, a distant subject B (a mountain) between the subjects A and C is focused because they are caught at the center of the viewfinder field.

To solve, eliminate or reduce the central focus error, an automatic focusing system has been invented, as is disclosed in U.S. Pat. No. 4,571,048. In this system, as is shown in FIG. 8C, the signal-processing circuit 108 and the peak hold circuit 109 calculate the distance the lens has moved, from the signals IA and IB output from the rangefinder 101. The circuit 109 generates a signal representing this distance. The A/D converter 110 converts the signal into digital data. In accordance with the digital data, the lens driver 111 drives the lens, thereby bringing the subject into focus.

More specifically, the rangefinder 101 is pivoted, thus scanning all objects caught in a limited scanning region E of the viewfinder field, including parts of the subjects A, B and C, and generates signals. The circuits 108 and 109 process these signals, thus finding the distances between the viewfinder and the subjects. Of these signals, the signal showing the closest focusing distance is converted into digital data. The lens driver 111 drives the lens, thereby adjust the focus.

The automatic focusing technique, described above, is disadvantageous, however, in the following two respects:

First, since the rangefinder 101 is pivoted around an axis perpendicular to the base length, it requires a relatively large space. Therefore, it is not suitable for use in compact cameras.

Second, the above-described scanning method may cause focusing errors, for the following reason. The rangefinder 101 is pivoted, thus moving the auto-focus spot-beam in the horizontal direction. If the target subject 102 is an elongated one and inclines slightly to the horizontal direction as is shown in FIG. 9, the it is irradiated with the entire spot-beam at some portions, and with only part of the spot-beam at other portions, as is shown in FIG. 9, too. In the former case, only a part of the spot-beam, reflected from the subject 102, reaches the light-receiving element 105, as is shown at 105a and 105b in FIG. 9, whereby contrast errors occur. Due to the contrast errors, the data representing a distance shorter than the actual distance between the viewfinder and the subject 102 will be used to operate the lens driver 11, inevitably causing focusing errors. (Details of this type of focusing errors are disclosed in Published Unexamined Japanese Patent Application No. 63-131019.)

SUMMARY OF THE INVENTION

It is accordingly an object of the invention to provide an automatic focusing system which is free of incorrect distance measuring due to partial return of a spot-beam, and which is small enough to be used in compact cameras.

To the attain the object of the present invention, there is provided an automatic focusing system comprising: spot-beam projecting means for projecting a spot-beam on a subject; photo detecting means for receiving a spot-beam reflected from the subject and producing signals depending on the position in which the reflected spot-beam is received on its light receiving surface, said photo detecting means being separated from said spot-beam projecting means by the length of a base line; arithmetic means for performing arithmetic on the signals from said photo detecting means to determine the distance to the subject; driving means for driving a photo-taking lens in accordance with an output of said arithmetic means; and scanning means for permitting said spot-beam projecting means and said photo detecting means to scan the subject in a direction perpendicular to the direction of the base line.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6A illustrates scanning movement of a light projecting lens of a rangefinder unit of a fifth embodiment of the present invention;

FIG. 6B illustrates a specific projecting-lens moving mechanism of the rangefinder unit of the fifth embodiment;

FIG. 7B is a diagram representing how the center of the spot-beam moves on the light-receiving surface of the rangefinder unit according to the invention;

FIG. 8A illustrates a positional relationship between subjects and a camera;

FIG. 8B illustrates a concrete example of positions of subjects within the viewfinder of the camera;

DETAILED DESCRIPTION OF THE PREFERRED EMBODIMENTS

Figure 1A:
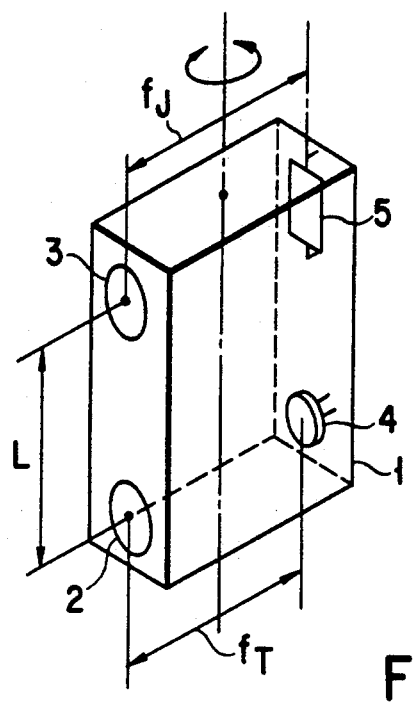
FIG. 1A is a schematic representation of a rangefinder unit in an automatic focusing system according to a first embodiment of the present invention.
Figure 1B:
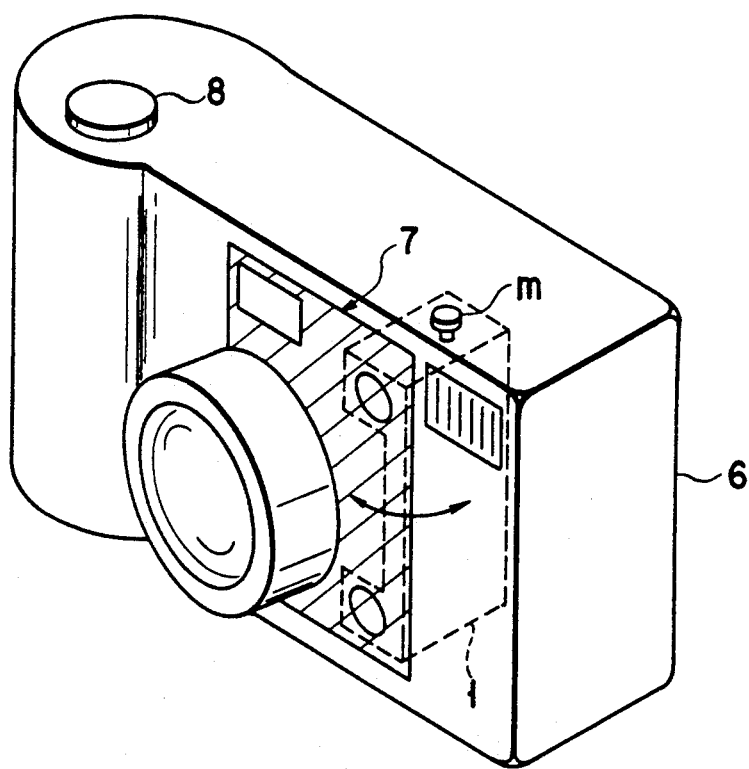
FIG. 1B is a schematic representation of a camera into which the rangefinder unit according to the first embodiment is incorporated.
Figure 1C:
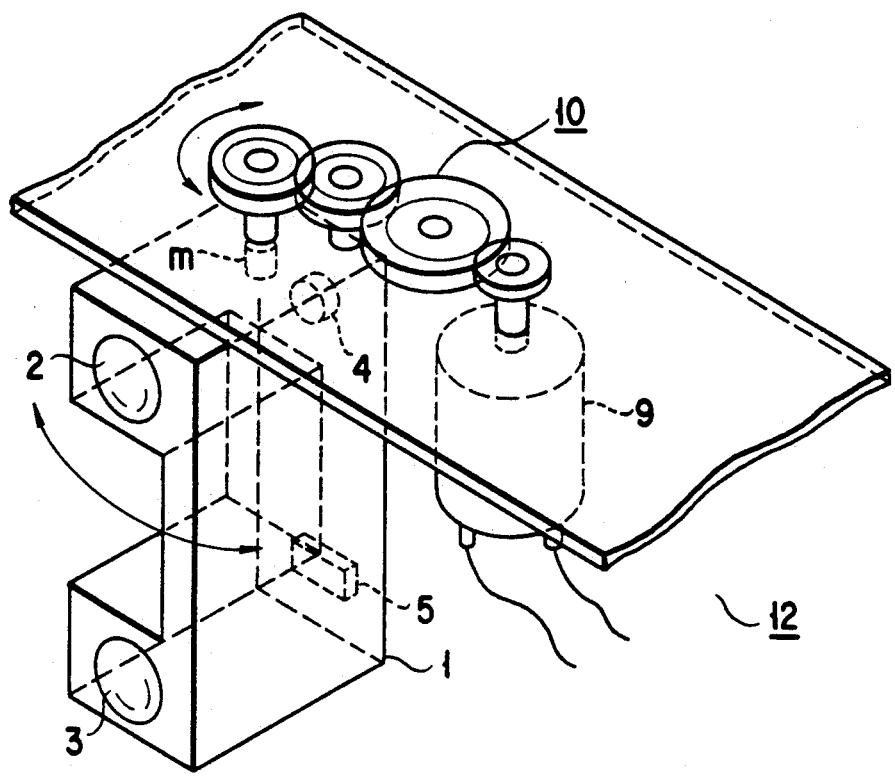
FIG. 1C illustrates the rotating mechanism of the rangefinder unit according to the first embodiment.
Figure 1D:
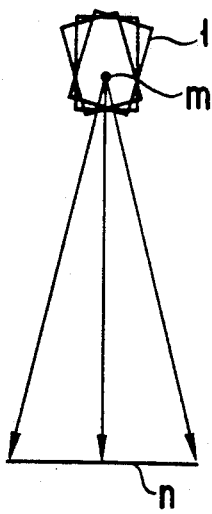
FIG. 1D illustrates the state where the rangefinder unit of the first embodiment rotates on a shaft m to scan a predetermined range n.

In FIG. 1A, there is illustrated a schematic construction of a rangefinder unit according to a first embodiment of the present invention. The rangefinder is incorporated into a camera as shown in FIG. 1B and, when the shutter release button is depressed, is pivoted on a shaft m, as shown in FIG. 1D, by a pivoting mechanism shown in FIG. 1C, thereby detecting distances to subjects while scanning a predetermined range n. Like reference characters will be used to designate like or corresponding parts throughout several drawings illustrating embodiments of the present invention.

The rangefinder unit, as shown in FIG. 1A, is equipped with a light projecting lens 2 and a light receiving lens 3 on the front part of a case 1, which are separated by the space of base length L along the vertical line. A light emitting device 4, such as an infrared emitting diode (IRED), is provided on the back of the case 1, which is separated from the light projecting lens 2 by its focal length fT. Likewise, a light receiving device 5 is provided on the back of the case 1, which is separated from the light receiving lens 3 by its focal length fJ. The light-receiving and light-emitting units may be changed with each other as long as they are disposed in the up-and-down direction.

The pivoting mechanism 12 of the rangefinder unit, as shown in FIG. 1B, is placed behind an infrared-transmitting, visible-light-cutting filter 7 on the front of a camera body 6. Upon depression of a shutter button 8 the unit case 1 is pivoted by the mechanism 12 comprised of a motor 9 and gears 10. Thereby, the rangefinder unit pivots, on the shaft m as shown in FIG. 1B, determine distances to subjects while scanning the predetermined range n within the viewfinder.

Figure 2:
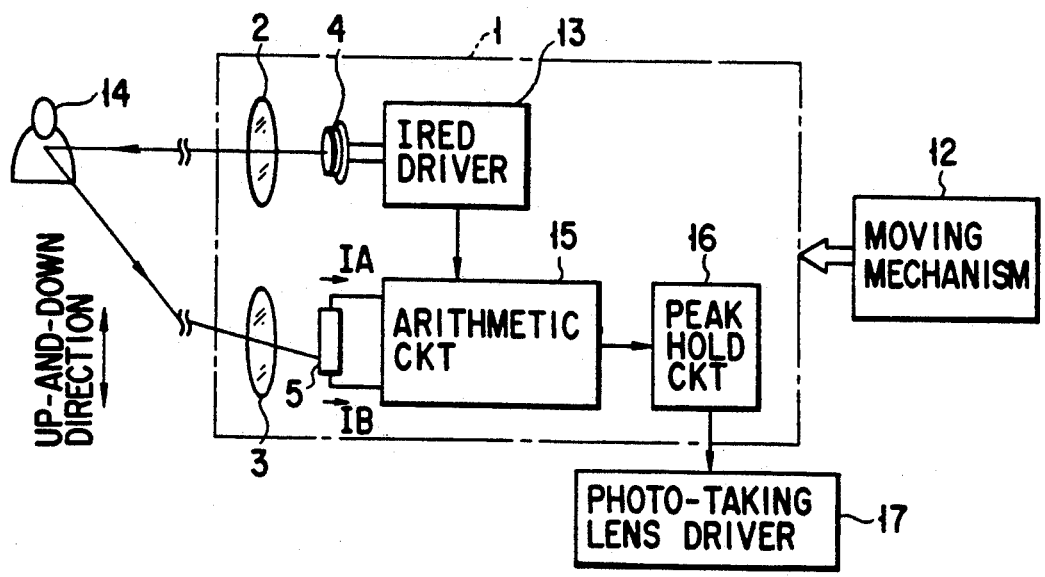
FIG. 2 illustrates a specific arrangement of the rangefinder unit of the first embodiment.

FIG. 2 illustrates a specific arrangement of the rangefinder unit of the first embodiment. In FIG. 2, the arrangement of the light-projecting and light-receiving units is opposite to that in FIG. 1A. That is, the light-projecting unit is placed above the light-receiving unit. When the shutter button 8, shown in FIG. 1B, is half depressed, an IRED driver 13 operates, causing the light emitting device 4 to emit through the lens 2 a distance measuring spot-beam toward a subject 14, while the rangefinder unit case 1 is being pivoted by the mechanism 12.

Reflected light from the subject enters through the lens 3 the photo detector 5 which produces output signals IA and IB. The output signals IA and IB are applied to a signal arithmetic processing circuit 15. An output signal of the arithmetic processing circuit 15 is applied to a peak hold circuit 16 where it is stored. The output signals IA and IB vary in magnitude according to the distance to the subject. The shorter the distance, the greater their output values become. Thus, the closest focusing distance signal stored in the peak hold circuit 16 represents the shorter distance.

The photo-taking lens is driven to move by a photo-taking lens driver 17 in accordance with the results of the distance measurement.

Figure 3A:
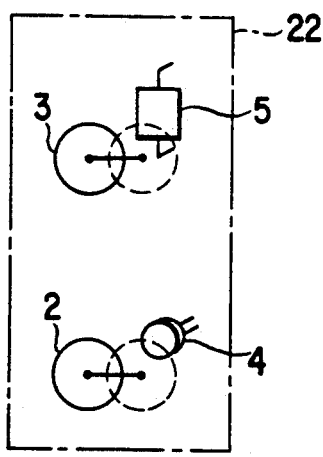
FIG. 3A illustrates scanning movement of a light projecting lens and a light receiving lens of a rangefinder unit of a second embodiment of the present invention.
Figure 3B:
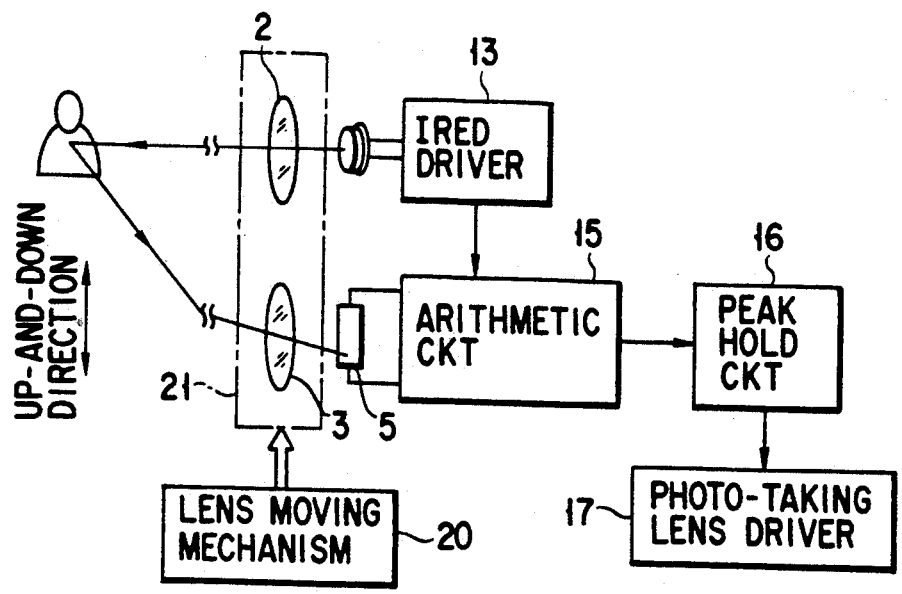
FIG. 3B illustrates a specific arrangement of the rangefinder unit of the second embodiment.
Figure 3C:
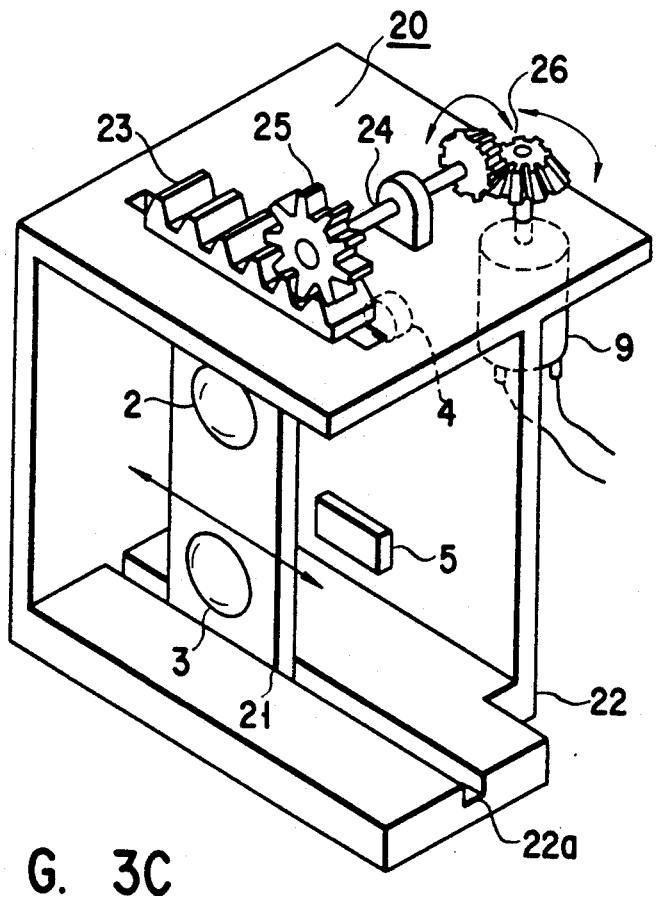
FIG. 3C illustrates the lens moving mechanism of the rangefinder unit of the second embodiment.

Next, FIG. 3A illustrates scanning movement of the light-projecting and light-receiving units of a rangefinder unit of a second embodiment, FIG. 3B illustrates a schematic arrangement of the second embodiment, and FIG. 3C illustrates a specific arrangement of the moving mechanism of the second embodiment.

Although, in the first embodiment, the rangefinder itself is arranged to pivot, in the second embodiment, as shown in FIG. 3A, the light-emitting device 4 and the photo detector 5 are fixed, and only a moving lens unit 21 equipped with the light projecting and receiving lenses 2 and 3 is moved parallel by a lens moving mechanism 20 to determine distances as in the first embodiment.

In the lens moving mechanism 20, as shown in FIG. 3C, the moving lens unit 21 that is equipped with the lenses 2 and 3 with the space of the base length therebetween is provided in front of the unit case 22. The moving lens unit 21 is equipped with a rack 23 at its top and fit into a groove 22a at its bottom so that it can be moved right and left.

A pinion 25 that is attached to one end of a drive shaft 24 meshes with the rack 23. To the other end of the drive shaft is attached a bevel gear 26 which transmits driving force of the motor 9 to the rack 23 to move the lens unit 21.

Figure 3D:
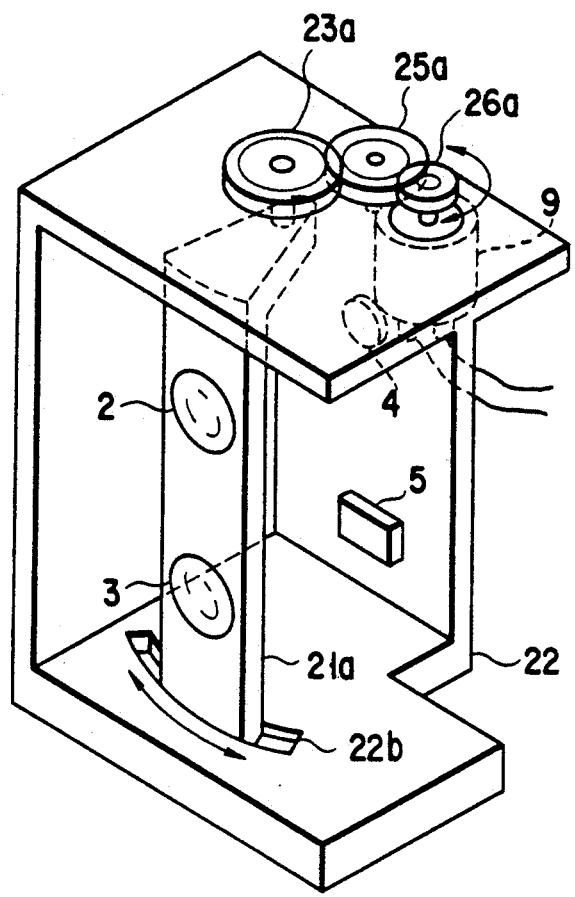
FIG. 3D shows another lens moving mechanism for use in the rangefinder unit of the second embodiment.

In the second embodiment described above, the lens moving lens unit 21 is moved parallel by means of the lens moving mechanism 20. According to the invention, however, the unit 21 can be rotated. FIG. 3D shows another type of an lens moving mechanism which is designed to rotate a lens unit 21a.

Figure 4A:
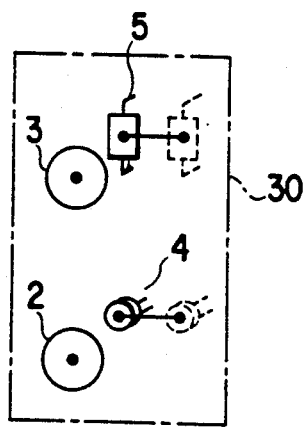
FIG. 4A illustrates scanning movement of a light projecting lens and a light receiving lens of a rangefinder unit of a third embodiment of the present invention.
Figure 4B:
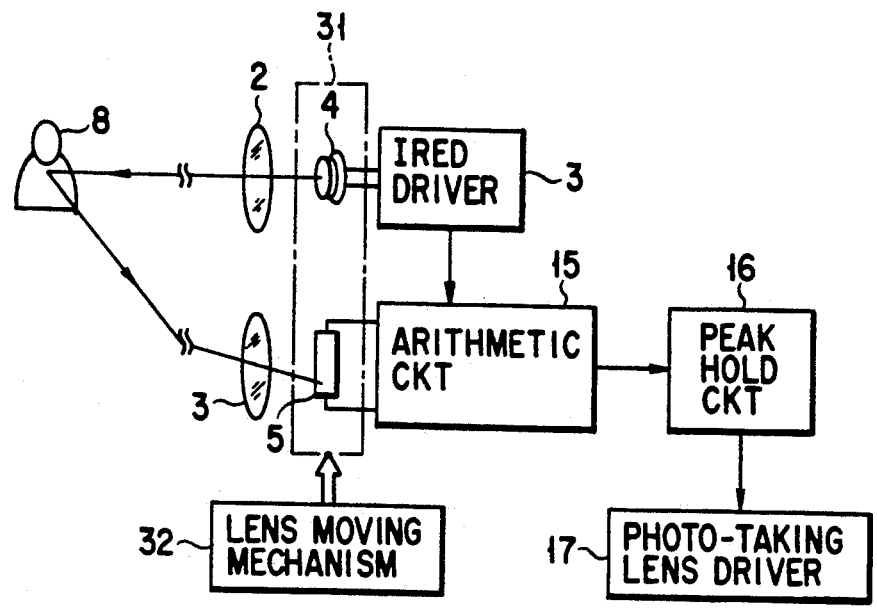
FIG. 4B illustrates a specific arrangement of the rangefinder unit of the third embodiment.
Figure 4C:
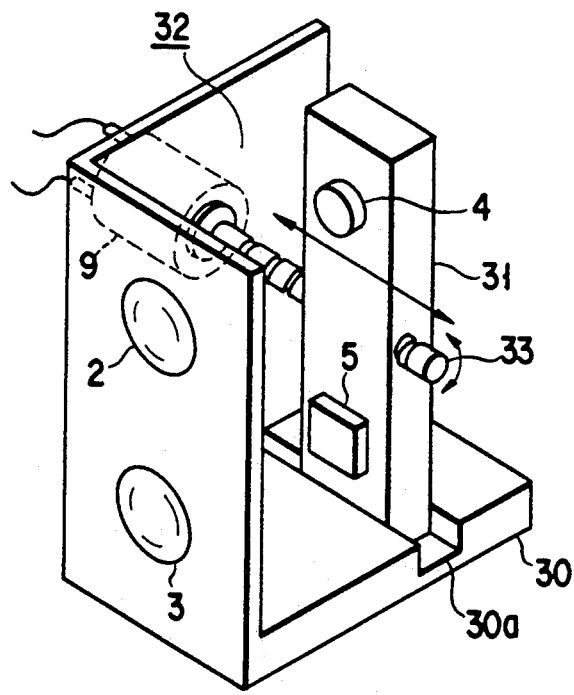
FIG. 4 illustrates the lens moving mechanism of the rangefinder unit of the third embodiment.
FIG. 4D shows another lens moving mechanism for use in the rangefinder unit of the third embodiment.

Next, FIG. 4A illustrates scanning movement of the light-projecting and light-receiving sections of a rangefinder unit of a third embodiment, FIG. 4B illustrates a schematic arrangement of the third embodiment, and FIG. 4C illustrates a specific arrangement of the moving mechanism of the third embodiment. The positions of the light-projecting lens 2 and the light-receiving lens 3 in FIG. 4A are shown reversed in FIG. 4C.

Although the second embodiment is arranged to move the lens unit, in the third embodiment, the lenses 2 and 3 are fixed at the unit case 30, and a light emitting and receiving unit 31 equipped with the light-emitting and light receiving devices 4 and 5 is moved parallel by a moving mechanism 32. That is, a hole with nut is bored, parallel to the plane on which the light emitting and receiving devices 4 and 5 are placed, in the light emitting and receiving unit 31. A ball screw 33, which is rotated by the motor 9, is screwed into the hole. The rotation of the motor 9 allows the light emitting and receiving unit 31 to move right and left.

Figure 4D:
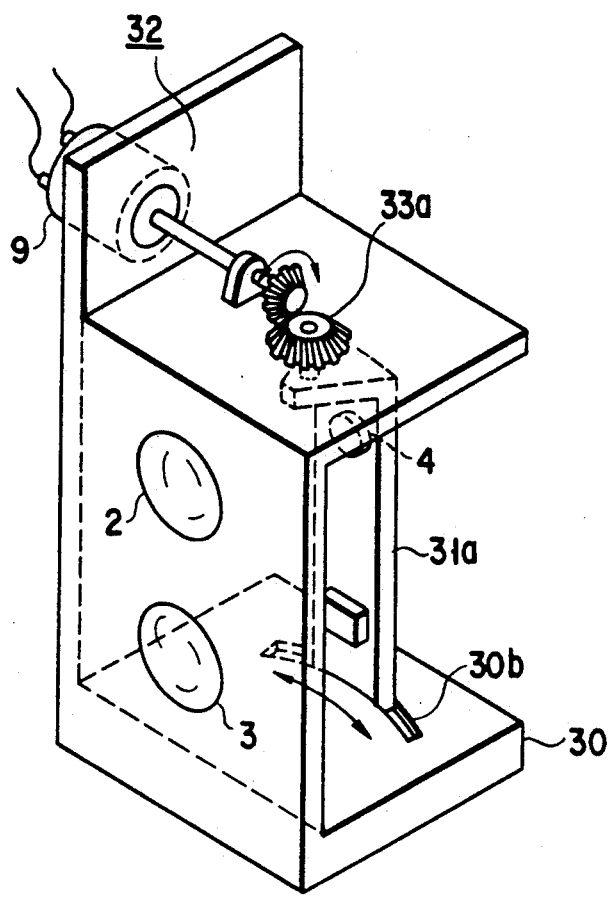

In the third embodiment described above, the light emitting and receiving unit 31 is moved parallel by the moving mechanism 32. Nonetheless, according to the invention, the unit 31 can be pivoted. FIG. 4D shows another type of a moving mechanism which is designed to pivot a light emitting and receiving unit 31a.

Figure 5A:
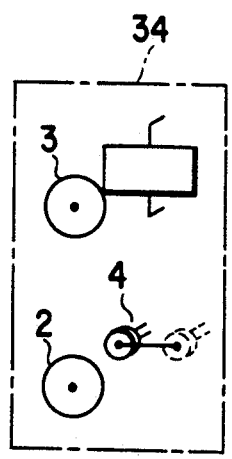
FIG. 5A illustrates scanning movement of a light projecting lens of a rangefinder unit of a fourth embodiment of the present invention.
Figure 5B:
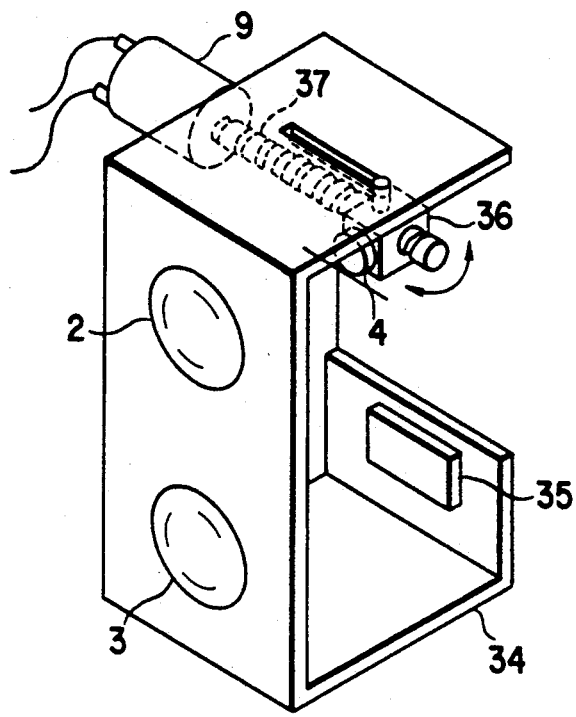
FIG. 5B illustrates a specific light-projecting-lens moving mechanism of the rangefinder unit of th fourth embodiment.

FIG. 5A illustrates, as a fourth embodiment of the present invention, a rangefinder unit in which the light emitting unit is arranged to make a scan for distance measurement. FIG. 5B illustrates a specific arrangement of a moving mechanism. The positions of the lenses 2 and 3 in FIG. 5A are reversed in FIG. 5B.

In the fourth embodiment, the lenses 2 and 3 are fixed, and only the light emitting device 4 is moved to the left or to the right by the moving mechanism. This arrangement permits the use of a photo detector 35 that is great in light receiving area.

In the moving mechanism, as shown in FIG. 5B, a ball screw 37 is screwed into the light emitting device 4 having a nut 36. The ball screw 37 is rotated by the motor 9, thereby moving the light emitting device 4 right and left.

Figure 5C:
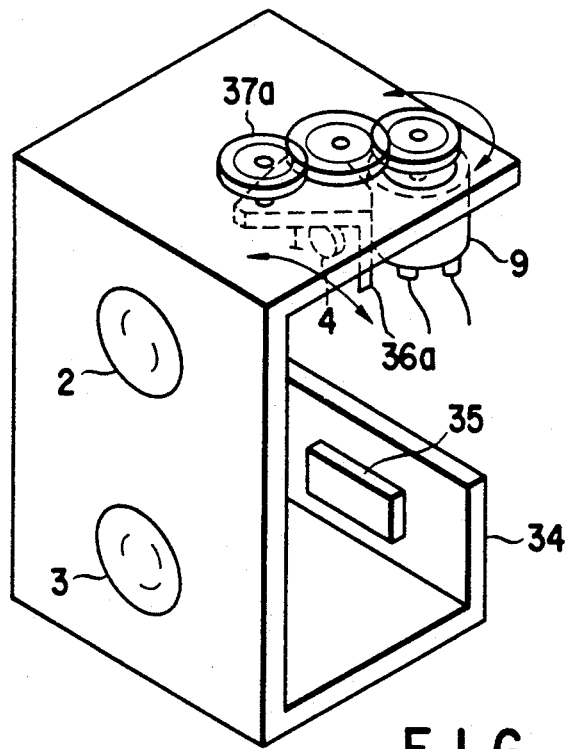
FIG. 5C shows another light-projecting-lens moving mechanism for use in the rangefinder unit of the fourth embodiment.

In the fourth embodiment, the light emitting device 4 is moved to the left or to the right. According to the invention, however, a light projecting element can be pivoted. FIG. 5C shows another light-projecting-lens moving mechanism which pivoted a light projecting element 36a.

FIG. 6A illustrates, as a fifth embodiment of the present invention, a rangefinder unit in which the light projecting lens is arranged to make a scan for distance measurement. FIG. 6B illustrates a specific arrangement of a moving mechanism.

In the fifth embodiment, a light projecting lens moving unit 38, equipped with the light projecting lens 2, is moved right and left along a groove 40a formed in a unit case 40 by rotation of a ball screw 39 coupled with the motor 9.

Figure 6C:
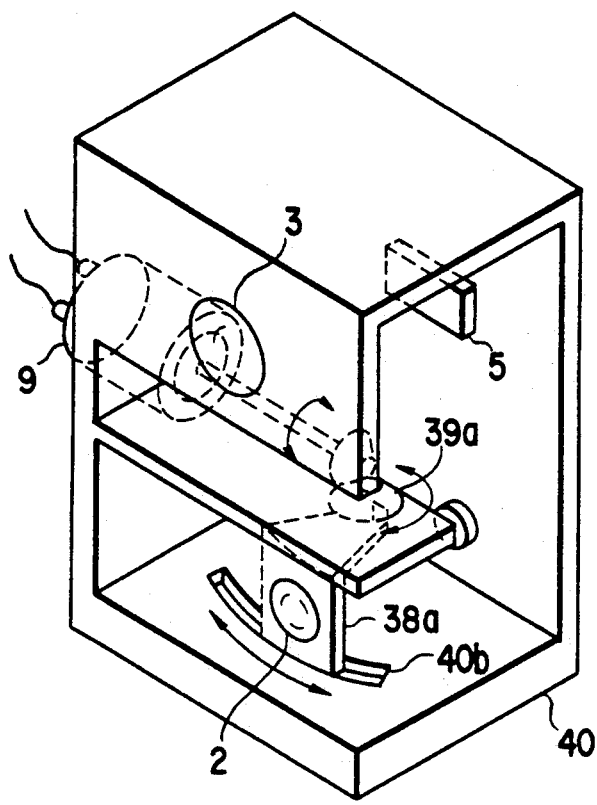
FIG. 6C shows another projecting-lens moving mechanism for us in the rangefinder unit of the fifth embodiment.

In the fifth embodiment, the light projecting lens moving unit 38 is moved to the left and to the right. Instead, it can be pivoted according to the present invention. FIG. 6C shows another projecting lens moving unit 38a which is designed to pivot.

Next, the partial return spot-beam images will be described with reference to FIGS. 7A and 7B.

Figure 7A:
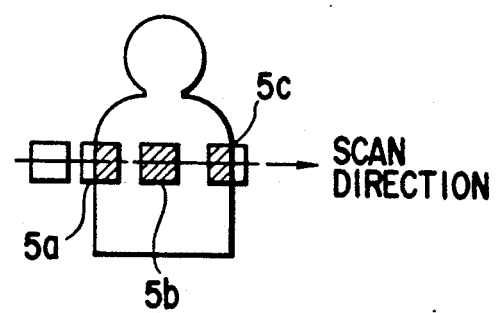
FIG. 7A illustrates the direction in which a subject is scanned by the rangefinder unit of the present invention and spot-beams applied to the subject.
Figure 8C:
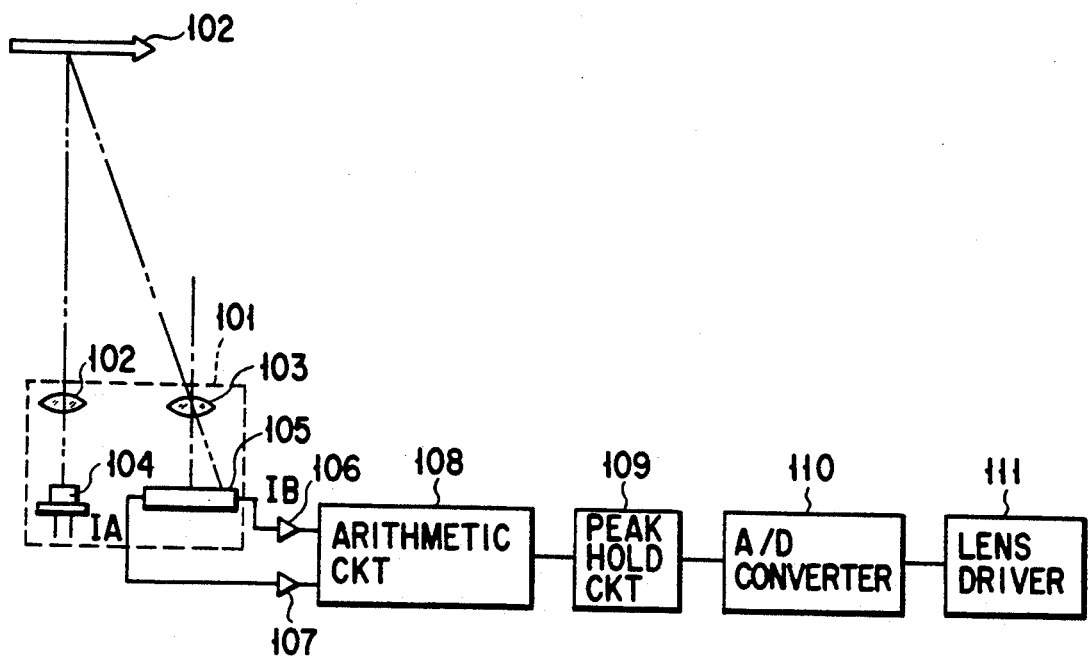
FIG. 8C illustrates an arrangement of a conventional automatic focusing system.

FIGS. 7A and 7B illustrate reception states of spot-beams reflected from a subject onto the surface of the photo detector in the rangefinder unit of the present invention and shifts of the center of gravity of return spot-beam images on the photo detector. For comparison, FIG. 9 illustrates reception states of spot-beams reflected from a subject onto the photo detector in the conventional rangefinder unit and shifts of the center of gravity of return spot-beam images on the photo detector.

Figure 9:
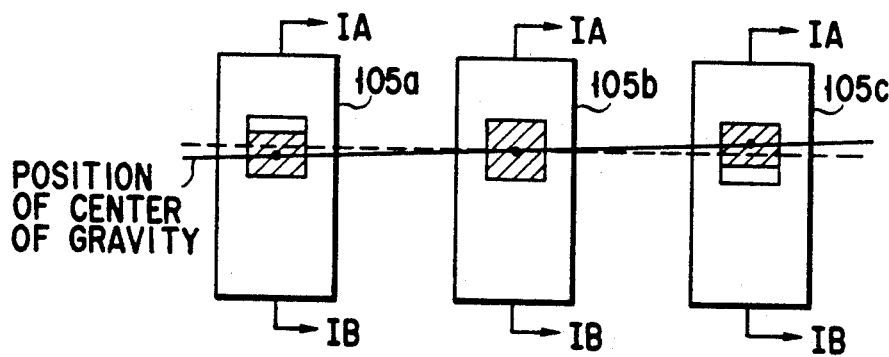
FIG. 9 is a diagram showing how the center of the spot-beam moves on the light-receiving surface of the conventional rangefinder unit.

As is evident from FIG. 9, in the conventional rangefinder unit, the spot-beam moves up and down on the light-receiving surface of the photo detector, since its is pivoted in such a direction that the light emitting and receiving unit has horizontal base length and horizontal scanning direction.

In the conventional rangefinder unit, the return spot-beam images on the photo detector move up and down as shown in FIG. 9 because the direction of the base line joining the light projecting unit and the photo detecting unit and the direction of scanning are coincident with each other. The up-and-down movement of the return spot-beam images will break the balance of two outputs IA and IB of the photo detector. Thus, the center of gravity of the return spot-beam images that should originally remain at a fixed point as shown by a dotted line will shift up and down as indicated by a solid line. Therefore, photographs that are out of focus with the foreground in focus will be taken because of contrast errors due to the shift of the center of gravity.

According to the present invention, however, as can be seen from FIG. 7, the return spot-beam images on the photo detector surface, indicated by oblique lines, have their width changed horizontally. Thus, the balance of outputs IA and IB from output terminals of the photo detector, which are provided to be opposed to each other in the vertical direction, is not altered. Although the center of gravity shifts right and left (in the direction of the width), it will not shift in the up-and-down direction. The shift of the center of gravity in the direction of the width, resulting from changes in the return spot-beam images on the photo detector surface, excludes the influence of the contrast error and produces no out-of-focus with the foreground in focus.

As described above, the scanning perpendicular to the direction of the base line permits pivotal motion in the f direction of the lenses shorter than the base length. Thus, distance measurement can be made with small movements of the rangefinder based on rotary scanning, and automatic focusing systems can be made compact without being affected by the base-line length. Further, accurate focusing can be achieved without being affected by contrast error.

In the above embodiments, a peak hold circuit has been used as storage means. Alternatively, an arrangement may be used in which a distance signal is stored in the memory of a central processing unit (CPU) with each distance measurement, and the closest focusing distance data is selected from among stored distance values at the termination of scanning. According to such an arrangement, when photographs are taken with a camera held perpendicular to the ground, the use of only data corresponding to the center of the viewfinder is allowed, preventing the lower part of photographs, for example, the ground, from being focused.

As can be understood from the above, the present invention can provide an automatic focusing system which is free of incorrect distance measuring due to partial return of a spot-beam, and which is small enough to be used in compact cameras.

Additional advantages and modifications will readily occur to those skilled in the art. Therefore, the invention in its broader aspects is not limited to the specific details, and representative devices shown and described herein. Accordingly, various modifica-tions may be made without departing from the spirit or scope of the general inventive concept as defined by the appended claims and their equivalents.

What is claimed is:

1. An automatic focusing system for a camera having range detecting means for projecting a spot-beam on a subject, for receiving a reflected light beam of the spot-beam from the subject at a position separated by a base length from a spot-beam projecting position, and for detecting a distance to the subject, the range detecting means comprising:

spot-beam projecting means for projecting the spot-beam on the subject, the spot-beam projecting means comprising a spot-beam projecting housing fixed to maintain a predetermined optical relationship between a spot-beam projecting element and a spot-beam projecting lens;

spot-beam receiving means for receiving the spot-beam reflected from said subject and for outputting signals in accordance with a plurality of spot-beam receiving positions, the spot-beam receiving means comprising a spot-beam receiving housing fixed to maintain a predetermined optical positional relationship between a spot-beam receiving element and a spot-beam receiving lens;

a beam member located at a position where a scanning operation is not disturbed by a photo taking lens, the beam member fixing an optical positional relationship between the spot-beam projecting housing and the spot-beam receiving housing;

a range finder unit including the spot-beam projecting housing and the beam member for connecting and fixing the spot-beam receiving housing thereto, said range finder unit being located such that a horizontal direction of said camera is a direction perpendicular to a direction of said base-length;

scanning means for causing said range finder unit to scan the subject in said horizontal direction of said camera, while rotating said range finder unit on an axis that corresponds to said direction of said base length;

first arithmetic means for performing an arithmetic operation on the signals output from said spot-beam receiving means when said spot-beam is projected on an edge portion of the subject to determine the distance to the subject;

second arithmetic means for performing an arithmetic operation on the signals output from the spot-beam receiving means when the spot-beam is projected on a non-edge portion of the subject;

photo-taking lens driving range determining means for determining one photo-taking lens driving range by comparing a plurality of outputs from the first and second arithmetic means; and and driving means for driving said photo-taking lens based on a plurality of outputs from said photo-taking lens driving range determining means.

* * * * *